(12) United States Patent
Hsu et al.

(10) Patent No.: US 8,576,251 B2
(45) Date of Patent: Nov. 5, 2013

(54) SCALING-UP CONTROL METHOD AND SCALING-UP CONTROL APPARATUS FOR USE IN DISPLAY DEVICE

(75) Inventors: Feng-Ming Hsu, Hsin-Chu (TW); Yu-Hsien Yang, Hsin-Chu (TW); Li-Ru Lyu, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 231 days.

(21) Appl. No.: 13/099,700

(22) Filed: May 3, 2011

(65) Prior Publication Data

US 2012/0038822 A1   Feb. 16, 2012

(30) Foreign Application Priority Data

Aug. 13, 2010   (TW) .............................. 99127211 A (51) Int. Cl.
  *G09G 5/00*   (2006.01)
(52) U.S. Cl.
  USPC .................................................. 345/660
(58) Field of Classification Search
  USPC .................................................. 345/660
  See application file for complete search history.

(56) References Cited

U.S. PATENT DOCUMENTS

| | | | | |
|---|---|---|---|---|
| 4,827,533 A * | 5/1989 | Tanaka | ........................... | 382/262 |
| 5,621,870 A * | 4/1997 | Shyu et al. | .................... | 345/671 |
| 5,673,340 A * | 9/1997 | Kanda | ............................ | 382/250 |
| 5,825,367 A * | 10/1998 | Shyu et al. | .................... | 345/668 |
| 5,889,895 A * | 3/1999 | Wong et al. | .................... | 382/300 |
| 6,611,260 B1 * | 8/2003 | Greenberg et al. | ........... | 345/204 |
| 7,589,748 B2 * | 9/2009 | Ahn | ................................ | 345/660 |
| 2001/0020950 A1 * | 9/2001 | Shimizu et al. | ............... | 345/611 |
| 2002/0028028 A1 * | 3/2002 | Michel | .......................... | 382/299 |
| 2003/0052977 A1 * | 3/2003 | Shim et al. | .................. | 348/220.1 |
| 2003/0185464 A1 * | 10/2003 | Maenaka et al. | .............. | 382/300 |
| 2004/0257475 A1 * | 12/2004 | Kim et al. | ...................... | 348/581 |
| 2007/0024638 A1 * | 2/2007 | Hoppe et al. | .................. | 345/606 |
| 2007/0025644 A1 * | 2/2007 | Wang et al. | ................... | 382/300 |
| 2007/0058179 A1 * | 3/2007 | Kuroki et al. | ................... | 358/1.2 |
| 2007/0071360 A1 * | 3/2007 | Kuroki et al. | ................. | 382/298 |
| 2007/0279523 A1 * | 12/2007 | Yamauchi | ..................... | 348/441 |
| 2008/0122872 A1 * | 5/2008 | Hsu et al. | ...................... | 345/667 |
| 2008/0143760 A1 * | 6/2008 | Ellis et al. | ..................... | 345/698 |
| 2009/0028465 A1 * | 1/2009 | Pan | .............................. | 382/300 |
| 2009/0179824 A1 * | 7/2009 | Tsujimoto et al. | ................ | 345/7 |
| 2009/0244324 A1 * | 10/2009 | Saito et al. | ............... | 348/231.99 |
| 2009/0285507 A1 * | 11/2009 | Chen | ............................ | 382/300 |
| 2010/0026898 A1 * | 2/2010 | Ueno et al. | .................... | 348/607 |
| 2011/0051998 A1 * | 3/2011 | Rhoads | ......................... | 382/100 |
| 2012/0257698 A1 * | 10/2012 | Zhang | ........................... | 375/355 |

\* cited by examiner

Primary Examiner — Xiao M. Wu
Assistant Examiner — Amir Shahmiri
(74) Attorney, Agent, or Firm — WPAT, PC; Justin King (57) ABSTRACT

A scaling-up control method and a scaling-up control apparatus are used in a display device. The display device includes a scaler for converting an original image signal into an output image signal by performing a linear interpolation. Moreover, by utilizing a global locking mechanism and a local locking mechanism to perform the linear interpolation to determine the actual position of the interpolated pixel, the position error of the pixel position is largely reduced. Since the difference between the calculated pixel value and the ideal pixel value is reduced, the imaging quality of the output image signal is enhanced.

10 Claims, 8 Drawing Sheets

SCALING-UP CONTROL METHOD AND SCALING-UP CONTROL APPARATUS FOR USE IN DISPLAY DEVICE

TECHNICAL FIELD

The present disclosure relates to a control method and a control apparatus for use in a display device, and more particularly to a scaling-up control method and a scaling-up control apparatus for use in a display device.

BACKGROUND

Generally, a display device is equipped with a scaler. The scaler is a device for converting video signals from one resolution to another resolution according to the user's requirement. For example, after an input VGA image signal having a lower resolution (e.g. 640×480) is received by the display device, according to the user's requirement, the input VGA image signal may be processed by the scaler in order to output a processed VGA image signal having a higher resolution (e.g. 1024×768). That is, if the user wants to upscale the resolution of a frame, a scaling-up operation should be performed by the scaler. Of course, the input image signal may be converted into another format of image signal (e.g. HDTV image signal).

Figure 1:
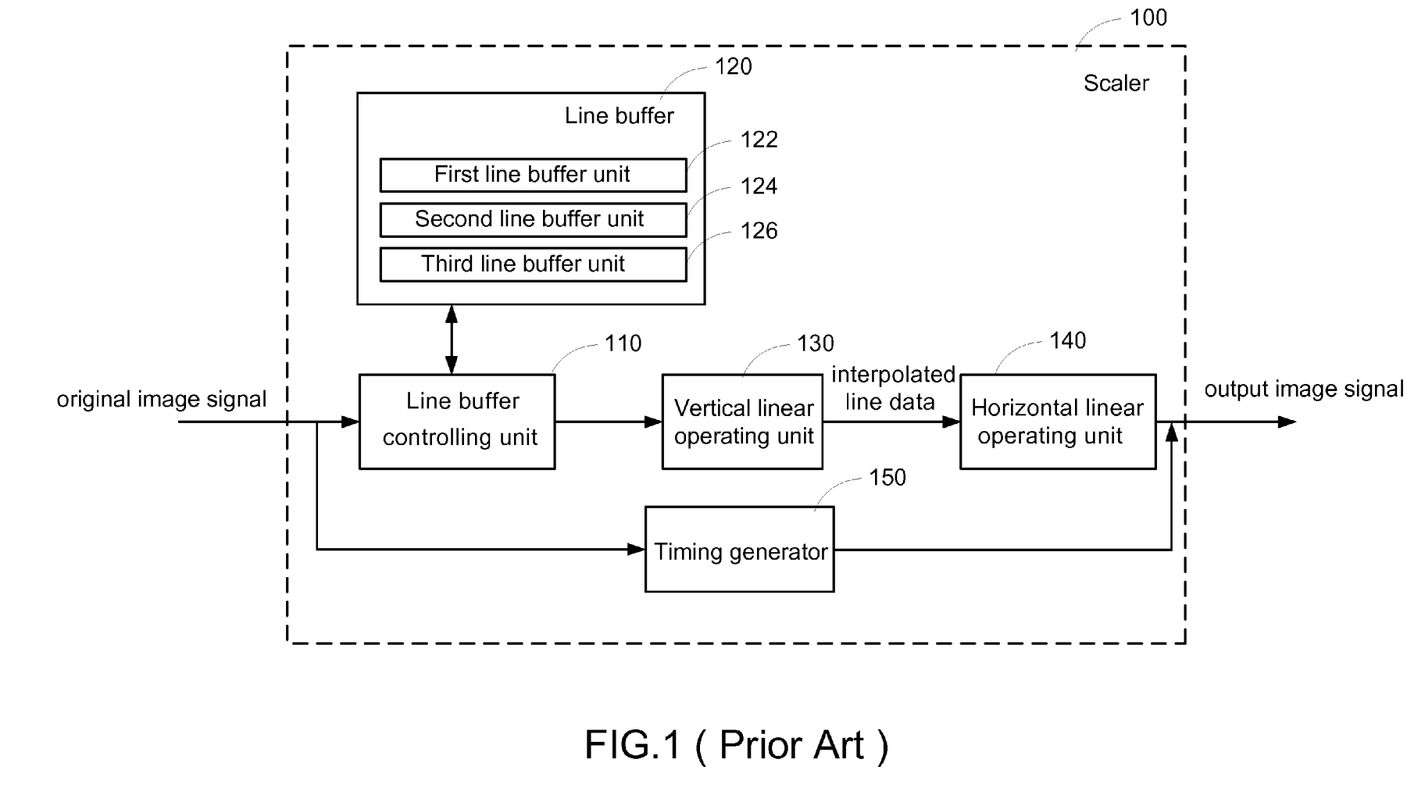
FIG. 1 is a schematic functional block diagram illustrating a scaler for performing a scaling-up operation according to the prior art.

FIG. 1 is a schematic functional block diagram illustrating a scaler for performing a scaling-up operation according to the prior art. As shown in FIG. 1, the scaler 100 comprises a line buffer controlling unit 110, a line buffer 120, a vertical linear operating unit 130, a horizontal linear operating unit 140 and a timing generator 150.

For example, by the line buffer controlling unit 110, the line buffer 120, the vertical linear operating unit 130 and the horizontal linear operating unit 140 of the scaler 100, an original image signal is converted into an output image signal. The resolutions of the original image signal and the output image signal are different. For example, the original image signal having a lower resolution (e.g. 640×480) is converted into the output image signal having a higher resolution (e.g. 1024×768).

The timing generator 150 is configured to receive the time signal of the original image signal and convert the time signal of the original image signal into the time signal of the output image signal. The time signal of the original image signal includes for example an original V-sync signal, an original H-sync signal and an original pixel clock. The time signal of the output image signal includes for example an output V-sync signal, an output H-sync signal and an output pixel clock. A process of performing a scaling-up operation by the scaler 100 will be illustrated as follows.

When the original image signal is transmitted to the scaler 100, 480 original line data of the original image signal are successively received by the line buffer controlling unit 110 and temporarily stored in the line buffer 120. Each of the 480 original line data includes 640 three-color values. The three-color values include an R pixel value, a G pixel value and a B pixel value. If the pixel value of each color is indicated by a byte, the data amount of each original line data is equal to 1920 bytes (i.e. 640×3=1920).

Generally, the size of the line buffer 120 is sufficient to temporarily store three original line data, which have the total data amount of 5760 bytes (i.e. 1920×3=5760). For example, as shown in FIG. 1, the line buffer 120 comprises three line buffer units 122, 124 and 126. Each of the line buffer units 122, 124 and 126 can store an original line data.

For effectively utilizing the line buffer 120, after the first original line data and the second original line data have been respectively received by the first line buffer unit 122 and the second line buffer unit 124 and during the third original line data is being received by the third line buffer unit 126, the vertical linear operating unit 130 performs a linear interpolation to calculate at least one interpolated line data according to the first original line data and the second original line data outputted from the line buffer controlling unit 110. The interpolated line data is then transmitted to the horizontal linear operating unit 140.

After the third original line data has been received by the third line buffer unit 126 and during a fourth original line data is being received by the first line buffer unit 122, the vertical linear operating unit 130 performs a linear interpolation to calculate at least one interpolated line data according to the second original line data and the third original line data outputted from the line buffer controlling unit 110. The interpolated line data is then transmitted to the horizontal linear operating unit 140.

Similarly, after the fourth original line data has been received by the first line buffer unit 122 and during a fifth original line data is being received by the second line buffer unit 124, the vertical linear operating unit 130 performs a linear interpolation to calculate at least one interpolated line data according to the third original line data and the fourth original line data outputted from the line buffer controlling unit 110. The interpolated line data is then transmitted to the horizontal linear operating unit 140.

From the above discussions, at the moment when one of the line buffer units of the line buffer 120 is receiving an original line data, the two original line data stored in the other two line buffer units are transmitted to the vertical linear operating unit 130 through the line buffer controlling unit 110, and the interpolated line data is calculated by the vertical linear operating unit 130. The above steps of processing the original line data are repeatedly done until all of the 480 original line data are converted into 768 interpolated line data. That is, the 768 interpolated line data constitute an interpolated image signal.

After the interpolated line data successively outputted from the vertical linear operating unit 130 are received by the horizontal linear operating unit 140, the horizontal linear operating unit 140 performs the linear interpolations again to convert the 768 interpolated line data into 768 output line data. The 768 output line data constitute the output image signal.

That is, since the 480 original line data are converted into the 768 interpolated line data by the vertical linear operating unit 130, the interpolated image signal has a resolution of 640×768. The data amount of each interpolated line data is equal to 1920 bytes (i.e. 640×3=1920). Moreover, by the horizontal linear operating unit 140, each interpolated line data having the data amount of 1920 bytes (i.e. 640×3=1920) is converted into a corresponding output line data having the data amount of 3072 bytes (i.e. 1024×3=3072). That is, the output image signal constituted by the 768 output line data has a resolution of 10240×768.

Figure 2A:
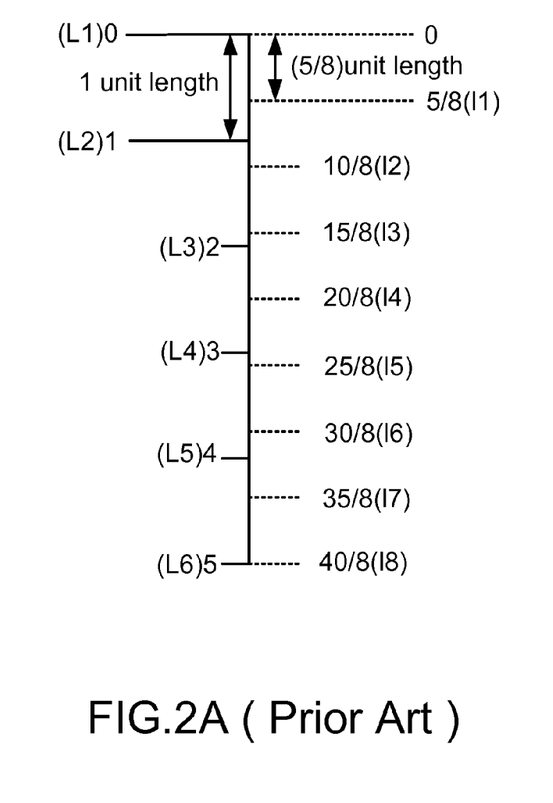
FIGS. 2A and 2B schematically illustrate the interpolated line data generated by the vertical linear operating unit in the ideal condition.
Figure 2B:
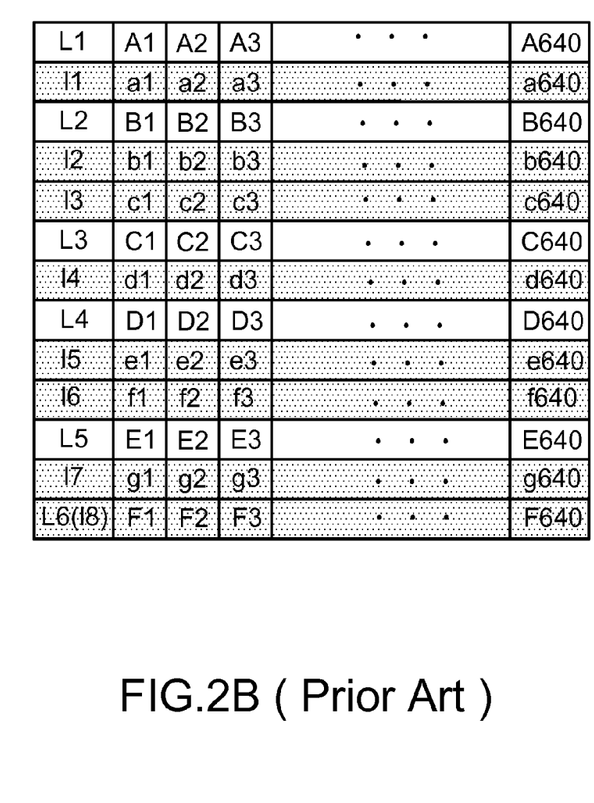

FIGS. 2A and 2B schematically illustrate the interpolated line data generated by the vertical linear operating unit in the ideal condition. Since the 480 original line data are converted into the 768 interpolated line data by the vertical linear operating unit 130, the vertical ratio factor is equal to 5/8 (i.e. 480/768=5/8). That is, if a first length between two consecutive original line data is equal to 1 unit length and a second length between two consecutive interpolated line data is 5/8 unit length, the ratio of the second length to the first length is defined as the vertical ratio factor (5/8). The vertical linear operating unit 130 performs the linear interpolation according to the vertical ratio factor. In addition, since the length between two consecutive original line data is equal to 1 unit length, it is indicated that the length between the same pixel positions of the two consecutive original line data (e.g. the first pixel positions of the two consecutive original line data) is equal to 1 unit length.

Please refer to FIG. 2A, which schematically illustrates the relations between the positions of the original line data and the interpolated line data when the linear interpolation in the vertical direction is performed by the vertical linear operating unit. As shown in FIG. 2A, five unit lengths are equal to eight 5/8 unit lengths. That is, every 5 original line data are converted into 8 interpolated line data. Similarly, the relations between the positions of the successive original line data and interpolated line data are similar to those illustrated above, and are not redundantly described herein.

Please refer to FIG. 2B. The first-color pixel values (e.g. the red pixel values) of the first original line data L1 are successively A1, A2, A3~A640, and the first-color pixel values of the second original line data L2 are successively B1, B2, B3~B640. Since the first interpolated line data is separated from the first original line data L1 by 5/8 unit length, the first interpolated line data is arranged between the first original line data L1 and the second original line data L2. After the linear interpolation is performed, the first-color pixel values of the first interpolated line data l1 are obtained by a formula: $an=(3/8)An+(5/8)Bn$, where n is an integer from 1 to 640. That is, the first-color pixel values of the first interpolated line data l1 are determined according to the first-color pixel values at the corresponding positions of the first original line data L1 and the second original line data L2. Since the second original line data L2 is closer to the first interpolated line data l1 than the first original line data L1, the weight of the second original line data L2 is higher. Whereas, since the first original line data L1 is farther from the first interpolated line data l1 than the second original line data L2, the weight of the first original line data L1 is lower. The ways of acquiring other color pixel values (e.g. green pixel values and blue pixel values) of the first interpolated line data l1 are similar to those illustrated above, and are not redundantly described herein.

Please refer to FIG. 2B again. The first-color pixel values of the third original line data L3 are successively B1, B2, B3~B640, and the first-color pixel values of the fourth original line data L4 are successively C1, C2, C3~C640. Since the second interpolated line data is separated from the first original line data L1 by 10/8 unit length, the second interpolated line data is arranged between the second original line data L2 and the third original line data L3. After the linear interpolation is performed, the first-color pixel values of the second interpolated line data l2 are obtained by a formula: $bn=(6/8)Bn+(2/8)Cn$, where n is an integer from 1 to 640. In addition, since the third second interpolated line data is separated from the first original line data L1 by 15/8 unit length, the second interpolated line data is also arranged between the second original line data L2 and the third original line data L3. After the linear interpolation is performed, the first-color pixel values of the third interpolated line data l3 are obtained by a formula: $cn=(1/8)Bn+(7/8)Cn$, where n is an integer from 1 to 640.

That is, the first-color pixel values of the second interpolated line data l2 and the third interpolated line data l3 are determined according to the first-color pixel values at the corresponding positions of the second original line data L2 and the third original line data L3.

Please refer to FIG. 2B again. The first-color pixel values of the fourth original line data L4 are successively D1, D2, D3~D640, the first-color pixel values of the fifth original line data L5 are successively E1, E2, E3~E640, and the first-color pixel values of the sixth original line data L6 are successively F1, F2, F3~F640. Consequently, after the linear interpolation is performed, the first-color pixel values of the fourth interpolated line data l4 are obtained by a formula: $dn=(4/8)Cn+(4/8)Dn$; the first-color pixel values of the fifth interpolated line data l5 are obtained by a formula: $en=(7/8)Dn+(1/8)En$; the first-color pixel values of the sixth interpolated line data l6 are obtained by a formula: $fn=(2/8)Dn+(6/8)En$; and the first-color pixel values of the seventh interpolated line data l7 are obtained by a formula: $gn=(5/8)En+(3/8)Fn$. In addition, the sixth interpolated line data l6 is the same as the sixth original line data L6. The above steps are repeatedly performed until all of the 768 interpolated line data are acquired.

From the above discussion, according to the vertical ratio factor, the linear interpolation in the vertical direction is performed by the vertical linear operating unit, thereby acquiring the position of the interpolated line data and the weights of two consecutive original line data. Accordingly, the contents of the interpolated line data are calculated.

Figure 3A:
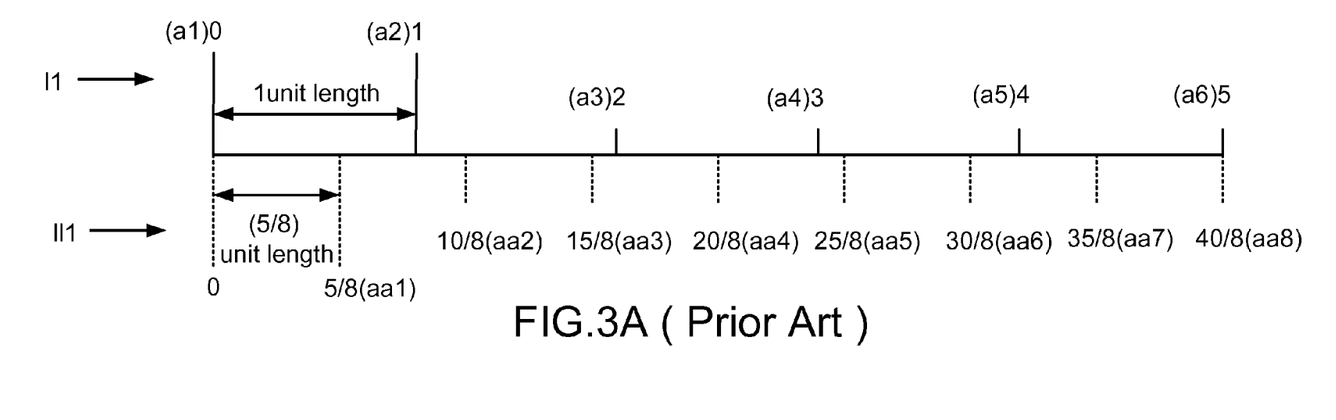
FIGS. 3A and 3B schematically illustrate the output line data generated by the horizontal linear operating unit in the ideal condition.
Figure 3B:
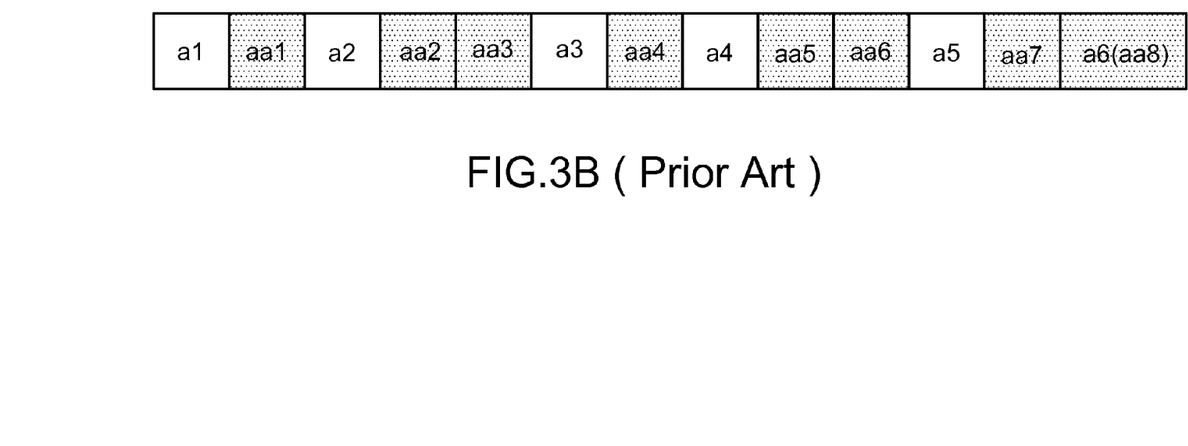

FIGS. 3A and 3B schematically illustrate the output line data generated by the horizontal linear operating unit in the ideal condition. By the horizontal linear operating unit 140, the 768 interpolated line data are converted into the 768 output line data. Since each interpolated line data has the data amount of 1920 bytes (i.e. 640×3=1920) and each output line data has the data amount of 3072 bytes (i.e. 1024×3=3072), the horizontal ratio factor is equal to 5/8 (i.e. 640/1024=5/8). Moreover, the first-color pixel values (e.g. the red pixel values) of the first interpolated line data l1 are successively a1, a2, a3~a640. After the conversion, the first-color pixel values of the first output line data ll1 are successively aa1, aa2, aa3~aa640.

Since the length between any two adjacent first-color pixel values of the first interpolated line data l1 is equal to 1 unit length and the length between any two adjacent first-color pixel values of the first output line data ll1 is 5/8 unit length, the horizontal linear operating unit 140 performs the linear interpolation according to the horizontal ratio factor.

Please refer to FIG. 3A, which schematically illustrates the relations between the positions of the first interpolated line data and the first output line data when the linear interpolation in the vertical direction is performed by the horizontal linear operating unit. As shown in FIG. 3A, five unit lengths are equal to eight 5/8 unit lengths. That is, every 5 first-color pixel values of the first interpolated line data l1 are converted into 8 first-color pixel values of the first output line data ll1. Similarly, the relations between the positions of the successive first-color pixel values of the first interpolated line data l1 (a7-a640) and successive first-color pixel values of the first output line data ll1 (aa9~aa1024) are similar to those illustrated above, and are not redundantly described herein.

Please refer to FIG. 3B. The first-color pixel values (e.g. the red pixel values) of the first output line data ll1 are successively a1, a2, a3~a6. Since the first first-color pixel value aa1 of the first output line data ll1 is separated from the first first-color pixel value a1 of the first interpolated line data l1 by 5/8 unit length, the first first-color pixel value aa1 of the first output line data ll1 is arranged between the first first-color pixel value a1 and the second first-color pixel value a2 of the first interpolated line data l1. After the linear interpolation is performed, the first first-color pixel value aa1 of the first output line data ll1 is obtained by a formula: $aa1=(3/8)a1+(5/8)a2$. That is, the first first-color pixel value aa1 of the first output line data ll1 is determined according to the first first-color pixel value a1 and the second first-color pixel value a2 of the first interpolated line data l1. Since the first first-color pixel value aa1 of the first output line data ll1 is farther from the first first-color pixel value a1 of the first interpolated line data l1 than the second first-color pixel value a2 of the first interpolated line data l1, the weight of the first first-color pixel value a1 is lower (3/8). Whereas, since the first first-color pixel value aa1 of the first output line data ll1 is closer to the second first-color pixel value a2 of the first interpolated line data l1 than the first first-color pixel value a1 of the first interpolated line data l1, the weight of the second first-color pixel value a2 is higher (5/8).

Similarly, the second first-color pixel value aa2 of the first output line data ll1 is obtained by a formula: aa2=(6/8)a2+(2/8)a3; the third first-color pixel value aa3 of the first output line data ll1 is obtained by a formula: aa3=(1/8)a2+(7/8)a3; the fourth first-color pixel value aa4 of the first output line data ll1 is obtained by a formula: aa4=(4/8)a3+(4/8)a4; the fifth first-color pixel value aa5 of the first output line data ll1 is obtained by a formula: aa5=(7/8)a4+(1/8)a5; the sixth first-color pixel value aa6 of the first output line data ll1 is obtained by a formula: aa6=(2/8)a4+(6/8)a5; the seventh first-color pixel value aa7 of the first output line data ll1 is obtained by a formula: aa7=(5/8)a5+(3/8)a6; and the eighth first-color pixel value aa8 is equal to the sixth first-color pixel value a6 of the first interpolated line data l1.

The ways of acquiring other first-color pixel values (aa9~aa1024) of the first output line data ll1 by converting the first-color pixel values a7~a640 of the first interpolated line data l1 are similar to those illustrated above, and are not redundantly described herein. Moreover, the ways of acquiring other color pixel values (e.g. green pixel values and blue pixel values) of the first output line data ll1 are similar to those illustrated above, and are not redundantly described herein.

From the above discussions, according to the horizontal ratio factor, the linear interpolation in the horizontal direction is performed by the horizontal linear operating unit, thereby acquiring the position of the pixel values of the output line data and the weights of two consecutive pixel values of the interpolated line data. In such manner, all of the 1024 first-color pixel values are acquired.

As is well known, the vertical linear operating unit 130 and the horizontal linear operating unit 140 are implemented by digital circuits. In the above controlling method of the scaler, the vertical ratio factor and the horizontal ratio factor are acceptable to the digital circuits because the denominator values of the vertical ratio factor and the horizontal ratio factor are 8, which is equal to a third power of 2. As such, the ideal positions of the interpolated line data and the ideal positions of all pixel values of the output line data can be exactly realized, and the exact pixel values can be calculated by the linear interpolation.

On the other hand, if the vertical ratio factor or the horizontal ratio factor fails to be acceptable to the digital circuits during the scaling-up operation is performed by the scaler, the pixel values calculated by the linear interpolation may have errors. For example, in a case that an original image signal having a lower resolution (e.g. 640×480) is received by a display device and converted into an output image signal having a higher resolution (e.g. 1440×1050), the vertical exact ratio factor is equal to 16/35 (i.e. 480/1050=16/35) and the horizontal exact ratio factor is equal to 4/9 (i.e. 640/1440=4/9). These two ratio factors are unacceptable to the digital circuits. Since the principles of the linear interpolation in the vertical direction and the linear interpolation in the horizontal direction are identical, only the linear interpolation in the vertical direction will be illustrated as follows.

If the distance between every two original line data is 1U (unit length), the ideal positions of interpolated line data are gradually increased at an increment of 16/35U. Whereas, if the vertical linear operating unit 130 is a 10-bit operating unit, the vertical linear operating unit 130 chooses a ratio factor which is the closest to 16/35 as the vertical approached ratio factor (i.e. 468/1024). In this situation, the actual positions of interpolated line data are gradually increased at an increment of 468/1024U. Consequence, each interpolated line data results in a position error E. The position error E=Δ=(16/35)U−(468/1024)U=0.000111607U.

Since the first interpolated line data results in a position error E=Δ, all pixel values of the first interpolated line data have errors. Since the $n^{th}$ interpolated line data results in a position error E=n×Δ, all pixel values of the $n^{th}$ interpolated line data have larger errors. As the value n increase, the position error of the $n^{th}$ interpolated line data increases, and the pixel values of the $n^{th}$ interpolated line data increase.

Since the vertical exact ratio factor is equal to 16/35, it means that sixteen unit lengths (U) is equal to thirty-five (16/35)U. For avoiding infinite expansion of the position error E, the vertical linear operating unit 130 of the conventional scaler 100 has a global locking mechanism for controlling the position error E to be 34×Δ at most. In addition, all pixel values of the thirty-fifth interpolated line data are compulsorily set to be equal to all pixel values of the sixteenth original line data.

Figure 4A:
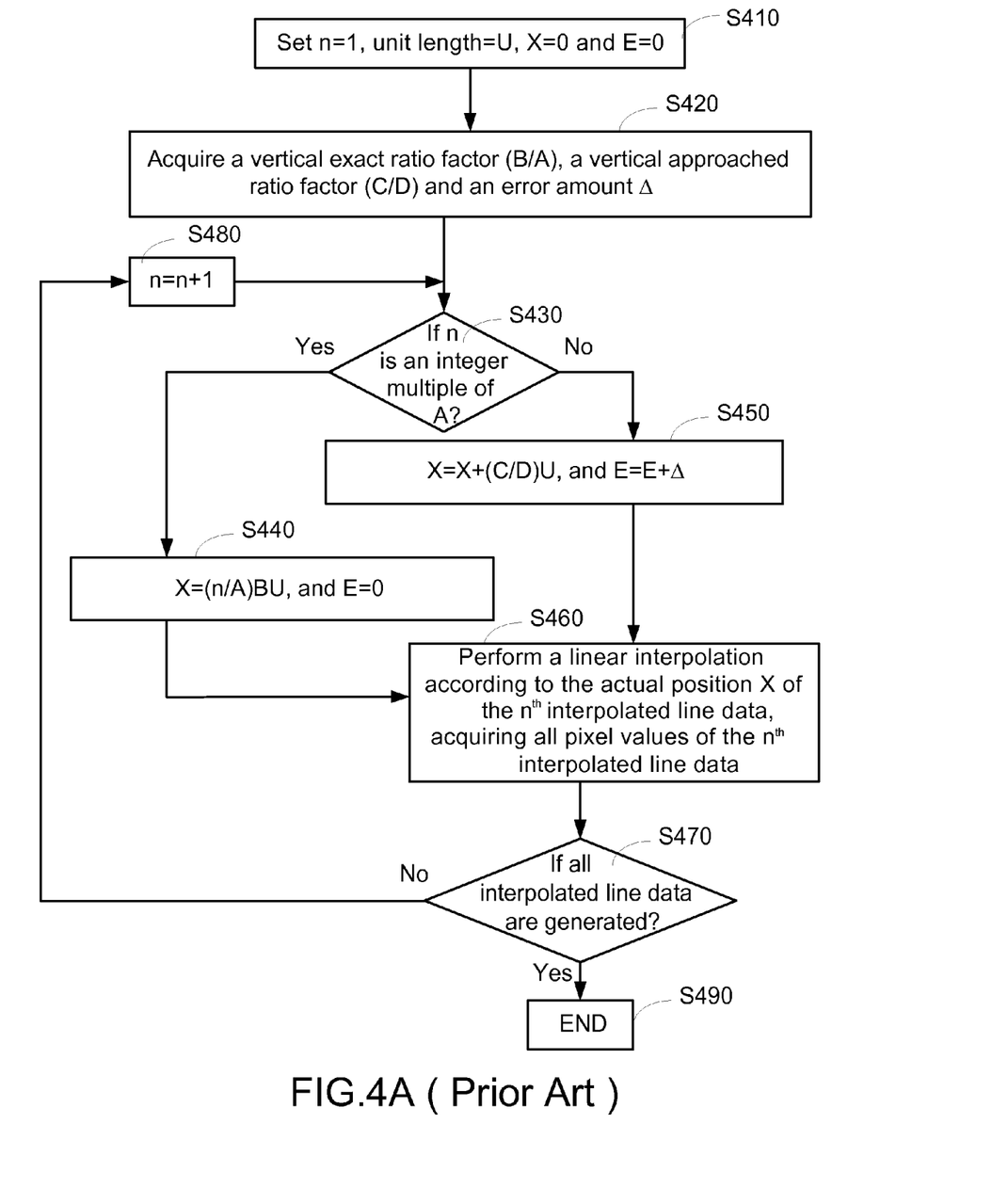
FIG. 4A is a flowchart illustrating a process for implementing a global locking mechanism of the vertical linear operating unit according to the prior art.

FIG. 4A is a flowchart illustrating a process for implementing a global locking mechanism of the vertical linear operating unit according to the prior art.

Firstly, in the step S410, the initial values are set, wherein n=1, unit length=U, X=0 and E=0, wherein n is a natural number, X is the actual position of the $n^{th}$ interpolated line data, and E is a position error.

Then, in the step S420, according to the resolutions of the original image signal and the output image signal, the vertical linear operating unit 130 acquires a vertical exact ratio factor (B/A) and a vertical approached ratio factor (C/D) and calculates an error amount Δ. For example, the vertical exact ratio factor (B/A) is 16/35, wherein A and B are natural numbers, and the numerator and the denominator of the fraction are reduced to the lowest terms. Moreover, since the vertical linear operating unit 130 is a 10-bit operating unit, the vertical approached ratio factor (C/D) is 468/1024, and the error amount Δ=(16/35)U−(468/1024)U=0.000111607U.

Then, the step S430 is performed to judge whether n is an integer multiple of A (=35). If the condition of the step S430 is satisfied, it means that the $35^{th}$ interpolated line data, the $70^{th}$ interpolated line data, the $105^{th}$ interpolated line data, . . . , are being processed. Meanwhile, the actual positions X of these interpolated line data are compulsorily set to be equal to the integer multiple n/A of B (B=16) unit lengths (i.e. X=(n/A)BU), and the position error E is set to be 0 (Step S440). The step S440 is used for performing the global locking mechanism. On the other hand, if the condition of the step S430 is not satisfied, the step S450 is performed to gradually increase the actual position X of the $n^{th}$ interpolated line data at an increment of (C/D)U and continuously increase the position error E between the actual position and the ideal position at an increment Δ.

Then, in the step S460, a linear interpolation is performed according to the actual position X of the $n^{th}$ interpolated line data, thereby acquiring all pixel values of the $n^{th}$ interpolated line data.

Then, the step S470 is performed to judge whether all interpolated line data are generated. If the condition of the step S470 is not satisfied, n=n+1 (Step S480) and the step S440 is performed. Whereas, if the condition of the step S470 is satisfied, the flowchart is ended (Step S490).

In a case that the vertical exact ratio factor (B/A) is equal to 16/35, the global locking mechanism of the vertical linear operating unit 130 generates the maximum position error E (=34×Δ) for the 34$^{th}$ interpolated line data and the minimum position error E (=0) for the 35$^{th}$ interpolated line data. The position error E of the 36$^{th}$ interpolated line data is Δ, and the position error E is continuously added.

Figure 4B:
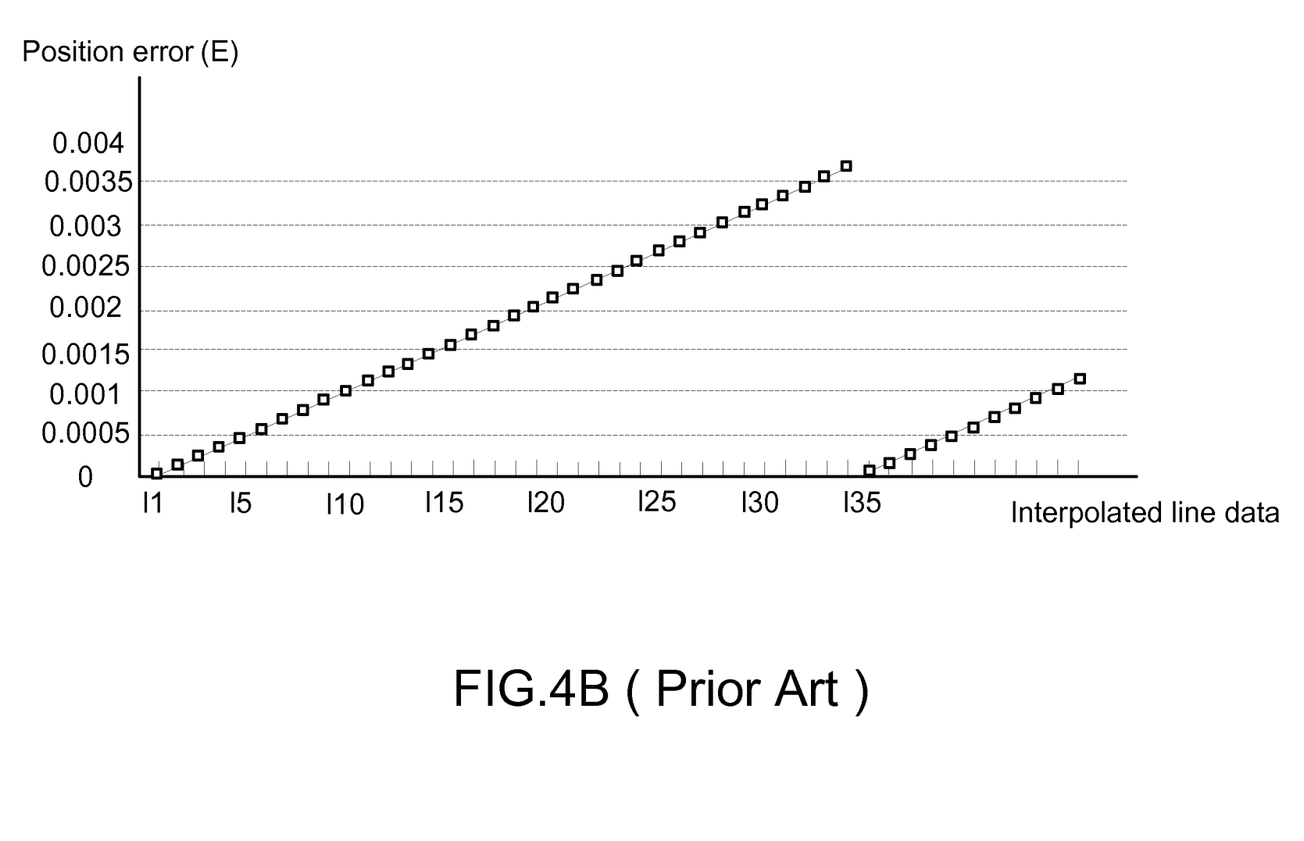
FIG. 4B is a schematic plot illustrating the position error resulting from a 10-bit vertical linear operating unit by utilizing the global locking mechanism to perform the linear interpolation.

FIG. 4B is a schematic plot illustrating the position error resulting from a 10-bit vertical linear operating unit by utilizing the global locking mechanism to perform the linear interpolation. Obviously, since the vertical exact ratio factor is 16/35, the position error E of the 35$^{th}$ interpolated line data are compulsorily set to be zero by the vertical linear operating unit. In addition, the maximum position error E (=34×Δ) is accumulated for the 34$^{th}$ interpolated line data. Similarly, the minimum position error E (=34×Δ) is accumulated for the 69$^{th}$ interpolated line data, and the position error E is zero for the 35$^{th}$ interpolated line data. The rest will be deduced by analogy until the 768$^{th}$ interpolated line data.

Similarly, if the horizontal exact ratio factor is unacceptable to the horizontal linear operating unit 140, the horizontal linear operating unit 140 should produce a horizontal approached ratio factor. Under this circumstance, a position error between the actual position and the ideal position of each pixel value of the output line data is generated. When the global locking mechanism is utilized to perform the linear interpolation, the accumulated position error becomes considerably high.

As the position error increases, the pixel value obtained by the calculation of the linear interpolation is farther from the ideal pixel value. Under this circumstance, the imaging quality of the output image signal is deteriorated and the original image fails to be precisely up-scaled.

Moreover, as shown in FIG. 2A, the first original line data and the second original line data should be firstly temporarily stored in the line buffer 120 and then transmitted to the vertical linear operating unit 130 through the line buffer controlling unit 110 in order to calculate the first interpolated line data at the position of 5/8 unit line. Under this circumstance, the timing of allowing the vertical linear operating unit 130 to calculate the first interpolated line data will be delayed. In addition, the pixel values of the first interpolated line data may fail to be processed in real time.

SUMMARY OF THE INVENTION

Therefore, the present invention provides a scaling-up control method and a scaling-up control apparatus for use in a display device. The display device includes a scaler for converting an original image signal into an output image signal by performing a linear interpolation. Moreover, by utilizing a global locking mechanism and a local locking mechanism to perform the linear interpolation to determine the actual position of the interpolated pixel, the position error of the pixel position is largely reduced. Since the difference between the calculated pixel value and the ideal pixel value is reduced, the imaging quality of the output image signal is enhanced.

In accordance with an aspect, the present invention provides a scaling-up control method of a display device for converting an original image signal having a first resolution into an interpolated image signal having a second resolution, and converting the interpolated image signal into an output image signal having a third resolution. Firstly, a distance between two consecutive pixels of the original image signal in a first direction is set to be 1 unit length (U). Then, the initial values are set: n=1, X=0 and E=0, wherein n is a natural number, X is an actual position of the n$^{th}$ data, and E is a position error. Then, an exact ratio factor (B/A) in the first direction and an approached ratio factor (C/D) in the first direction are acquired according to the first resolution and the third resolution, thereby calculating an error amount Δ between the exact ratio factor and the approached ratio factor, wherein A and B are natural numbers, and the numerator and the denominator of the fraction B/A are reduced to the lowest terms. Then, the following steps are sequentially done: (a) if n is not equal to an integer multiple of A, setting X=X+(C/D)U and E=E+Δ, or if n is equal to the integer multiple of A, performing a global locking mechanism; (b) if E>L_min, setting X=X+L_min and E=E−L_min, wherein L_min is a distinguishable length; (c) performing a linear interpolation according to the original image signal or the interpolated image signal and X, thereby calculating at least one pixel value of the n$^{th}$ data; and (d) setting n=n+1, and going to the step (a).

In accordance with another aspect, the present invention provides a scaling-up control apparatus for use in a display device. The scaling-up control apparatus includes a line buffer controlling unit, a line buffer, a vertical linear operating unit and a horizontal linear operating unit. The line buffer controlling unit receives an original image signal having a first resolution, wherein the original image signal includes plural original line data. The line buffer is electrically connected to the line buffer controlling unit for temporarily storing the plural original line data. The vertical linear operating unit is electrically connected to the line buffer controlling unit for allowing the line buffer controlling unit to read two consecutive original line data of the plural original line data from the line buffer, and generating n interpolated image signal having a second resolution according to a global locking mechanism and a local locking mechanism, wherein the interpolated image signal includes plural interpolated line data. The horizontal linear operating unit is electrically connected to the vertical linear operating unit for successively receiving the plural interpolated line data of the interpolated image signal, and generating an output image signal having a third resolution according to the global locking mechanism and the local locking mechanism, wherein the output image signal includes plural output line data.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention will be illustrated by referring to a 10-bit vertical linear operating unit and a 10-bit horizontal linear operating unit. In a case that an original image signal having a lower resolution (e.g. 640×480) is received by a display device and converted into an output image signal having a higher resolution (e.g. 1440×1050), the vertical exact ratio factor is equal to 16/35 (i.e. 480/1050=16/35) and the horizontal exact ratio factor is equal to 4/9 (i.e. 640/1440=4/9). Both of the two exact ratio factors are unacceptable to the vertical linear operating unit and the horizontal linear operating unit that are implemented by digital circuits. Under this circumstance, there is a position error between the actual position and the ideal position of each other interpolated line data; there is another position error between the actual position and the ideal position of each pixel value of the output line data is generated. For example, the vertical exact ratio factor and horizontal exact ratio factor are 16/35 and 4/9, respectively, wherein the numerator and the denominator of the fraction are reduced to the lowest terms.

Take the linear interpolation in the vertical direction for example. If the distance between every two original line data is 1U (unit length), the ideal positions of interpolated line data are gradually increased at an increment of 16/35U. Since the vertical linear operating unit is a 10-bit operating unit, the vertical linear operating unit chooses a ratio factor which is the closest to 16/35 as the vertical approached ratio factor (i.e. 468/1024). In this situation, the difference between the vertical exact ratio factor and the vertical approached ratio factor is equal to $\Delta$, wherein $\Delta = (16/35)U - (468/1024)U = 0.000111607U$. In addition, since the length between two consecutive original line data is equal to 1 unit length, it is indicated that the length between the same pixel positions of the two consecutive original line data (e.g. the first pixel positions of the two consecutive original line data) is equal to 1 unit length.

Moreover, by utilizing the conventional global locking mechanism, the maximum position error E (=34×$\Delta$) is generated at the position of the $34^{th}$ interpolated line data. In addition, the position error E is compulsorily zeroed at the position of the $35^{th}$ interpolated line data. After the position of the $36^{th}$ interpolated line data, the position error E is continuously added at an increment $\Delta$.

Since the minimum distinguishable length L_min of the 10-bit vertical linear operating unit is equal to U/1024=0.0009765625U, the global locking mechanism of the present invention further comprises a local locking mechanism for continuously monitoring the accumulated position error E of the vertical linear operating unit. In a case that the accumulated position error E is greater than the minimum distinguishable length L_min, the actual position of the interpolated line data is re-calculated. In addition, linear interpolation is performed according to the actual position of the updated interpolated line data.

Figure 5A:
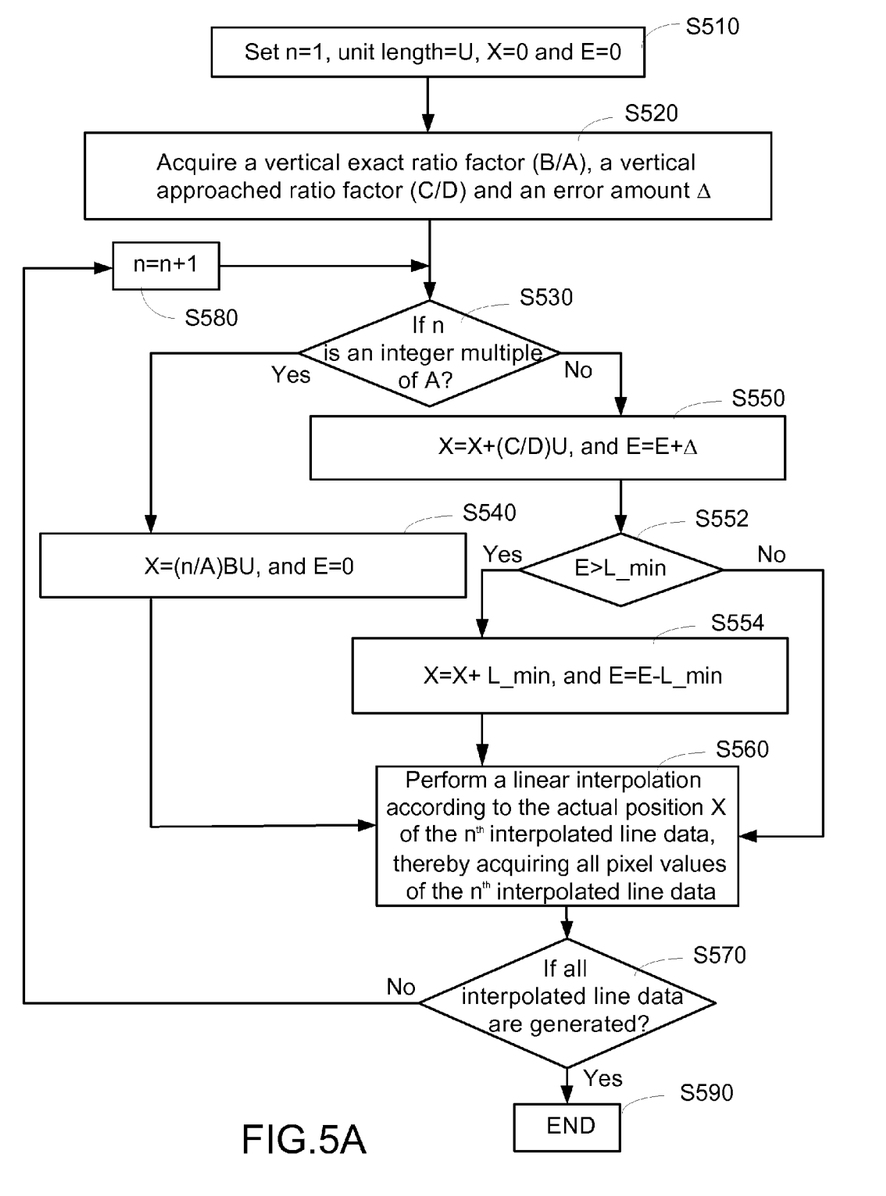
FIG. 5A is a flowchart illustrating a process for implementing a global locking mechanism and a local locking mechanism of the vertical linear operating unit according to an embodiment of the present invention.

FIG. 5A is a flowchart illustrating a process for implementing a global locking mechanism and a local locking mechanism of the vertical linear operating unit according to an embodiment of the present invention. The steps S552 and S554 constitute the local locking mechanism of the present invention. Moreover, before one global locking mechanism is performed, plural local locking mechanisms are performed.

Firstly, in the step S510, the initial values are set, wherein n=1, unit length=U, X=0 and E=0, wherein n is a natural number, X is the actual position of the $n^{th}$ interpolated line data, and E is a position error.

Then, in the step S520, according to the resolutions of the original image signal and the output image signal, the vertical linear operating unit acquires a vertical exact ratio factor (B/A) and a vertical approached ratio factor (C/D) and calculates an error amount $\Delta$. For example, the vertical exact ratio factor (B/A) is 16/35, wherein A and B are natural numbers, and the numerator and the denominator of the fraction are reduced to the lowest terms. Moreover, since the vertical linear operating unit is a 10-bit operating unit, the vertical approached ratio factor (C/D) is 468/1024, and the error amount $\Delta = (16/35)U - (468/1024)U = 0.000111607U$.

Then, the step S530 is performed to judge whether n is an integer multiple of A (=35). If the condition of the step S530 is satisfied, it means that the $35^{th}$ interpolated line data, the $70^{th}$ interpolated line data, the $105^{th}$ interpolated line data, . . . , are being processed. Meanwhile, the actual positions X of these interpolated line data are compulsorily set to be equal to the integer multiple n/A of B (B=16) unit lengths (i.e. X=(n/A)BU), and the position error E is set to be 0 (Step S540). The step S540 is used for performing the global locking mechanism. On the other hand, if the condition of the step S530 is not satisfied, the step S550 is performed to gradually increase the actual position X of the $n^{th}$ interpolated line data at an increment of (C/D)U and continuously increase the position error E between the actual position and the ideal position at an increment $\Delta$.

After the step S550 is done, the vertical linear operating unit judges whether the position error E of the $n^{th}$ interpolated line data is greater than the minimum distinguishable length L_min (Step S552). If the position error E of the $n^{th}$ interpolated line data is greater than the minimum distinguishable length L_min, the vertical linear operating unit adds the minimum distinguishable length L_min to the actual position X of the $n^{th}$ interpolated line data. That is, the actual position X of the $n^{th}$ interpolated line data is moved toward the ideal position of the $n^{th}$ interpolated line data by the minimum distinguishable length L_min, and the position error E is decreased by the minimum distinguishable length L_min. On the other hand, if the position error E of the $n^{th}$ interpolated line data is smaller than the minimum distinguishable length L_min, the actual position X of the $n^{th}$ interpolated line data and the position error E are not processed by the vertical linear operating unit.

Then, in the step S560, a linear interpolation is performed according to the actual position X of the $n^{th}$ interpolated line data, thereby acquiring all pixel values of the $n^{th}$ interpolated line data.

Then, the step S570 is performed to judge whether all interpolated line data are generated. If the condition of the step S570 is not satisfied, n=n+1 (Step S580) and the step S540 is performed. Whereas, if the condition of the step S570 is satisfied, the flowchart is ended (Step S590).

The above embodiments are illustrated by referring to the exact ratio factor (B/A)=16/35. By implementing the global locking mechanism and the local locking mechanism of the vertical linear operating unit, the position error E is effectively reduced. In accordance with the present invention, during one global locking mechanism is performed, the vertical linear operating unit continuously monitors the relationship between the position error E and the minimum distinguishable length L_min. If the position error E of the $n^{th}$ interpolated line data is greater than the minimum distinguishable length L_min, the actual position X of the $n^{th}$ interpolated line data is directly changed. In such way, the actual position X of the $n^{th}$ interpolated line data is moved toward the ideal position of the $n^{th}$ interpolated line data, and the position error E is correspondingly reduced.

Figure 5B:
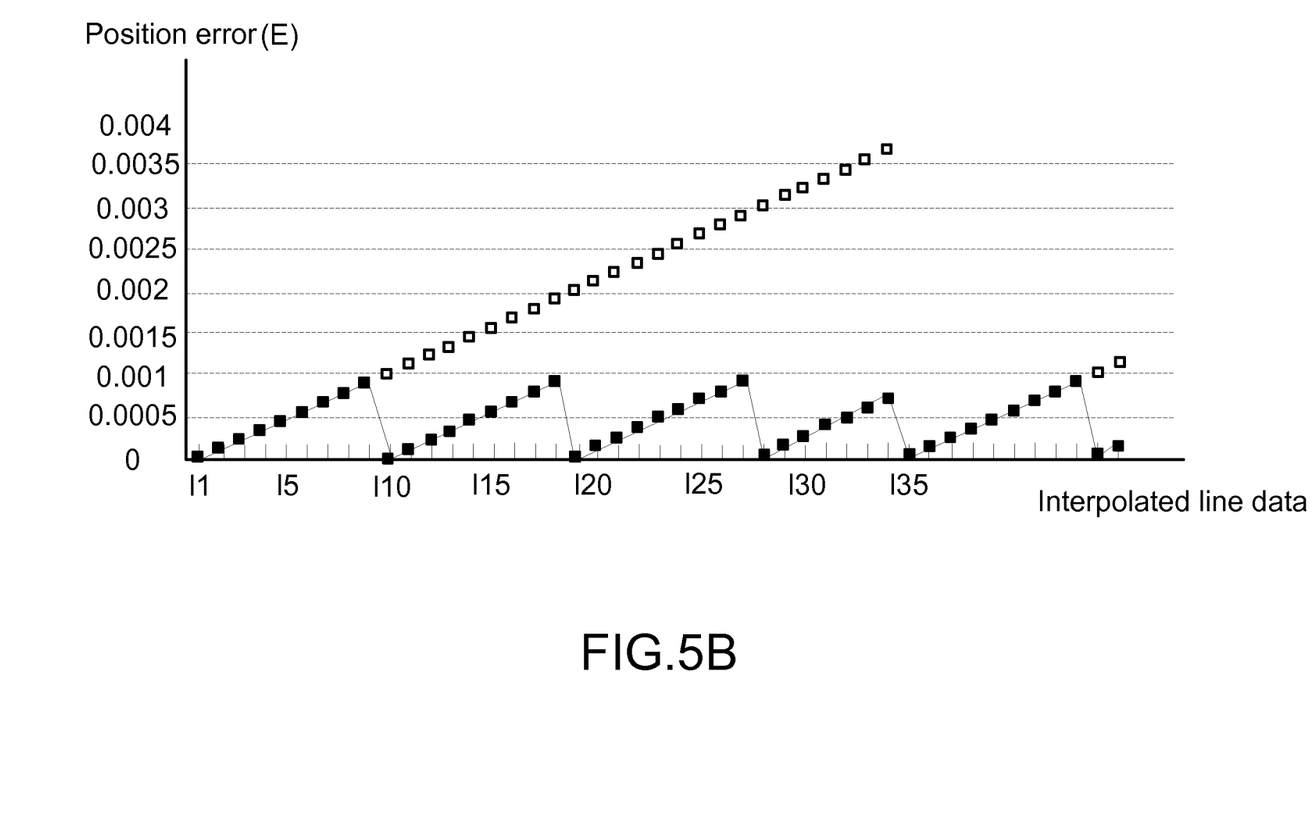
FIG. 5B is a schematic plot illustrating the position error resulting from a 10-bit vertical linear operating unit of the present invention by utilizing the global locking mechanism and the local locking mechanism to perform the linear interpolation.

FIG. 5B is a schematic plot illustrating the position error resulting from a 10-bit vertical linear operating unit of the present invention by utilizing the global locking mechanism and the local locking mechanism to perform the linear interpolation. Obviously, since the vertical exact ratio factor is 16/35, the position error E of the $35^{th}$ interpolated line data are compulsorily set to be zero by the conventional vertical linear operating unit. Whereas, the present invention further utilizes the local locking mechanism. When the accumulated position error E is greater than the minimum distinguishable length L_min, the actual position X of the $n^{th}$ interpolated line data is changed, so that the position error E of the $n^{th}$ interpolated line data is reduced. In comparison with the minimum accumulated position error E=34×Δ by utilizing only the global locking mechanism according to the prior art, the accumulated position error E is largely reduced to be below the minimum distinguishable length L_min by simultaneously utilizing the global locking mechanism and the local locking mechanism according to the present invention.

From the above description, the vertical linear operating unit of the present invention performs the linear interpolation by utilizing the global locking mechanism and the local locking mechanism, so that the position error E is largely reduced. Similarly, since the horizontal linear operating unit of the present invention performs the linear interpolation by utilizing the global locking mechanism and the local locking mechanism, the position error E is also reduced. Since the difference between the calculated pixel value and the ideal pixel value is reduced, the imaging quality of the output image signal is enhanced.

As previously described in the prior art, the first original line data and the second original line data should be firstly temporarily stored in the line buffer and then transmitted to the vertical linear operating unit through the line buffer controlling unit in order to calculate the first interpolated line data at the position of 5/8 unit line. Under this circumstance, the timing of allowing the vertical linear operating unit 130 to calculate the first interpolated line data will be delayed.

Figure 6:
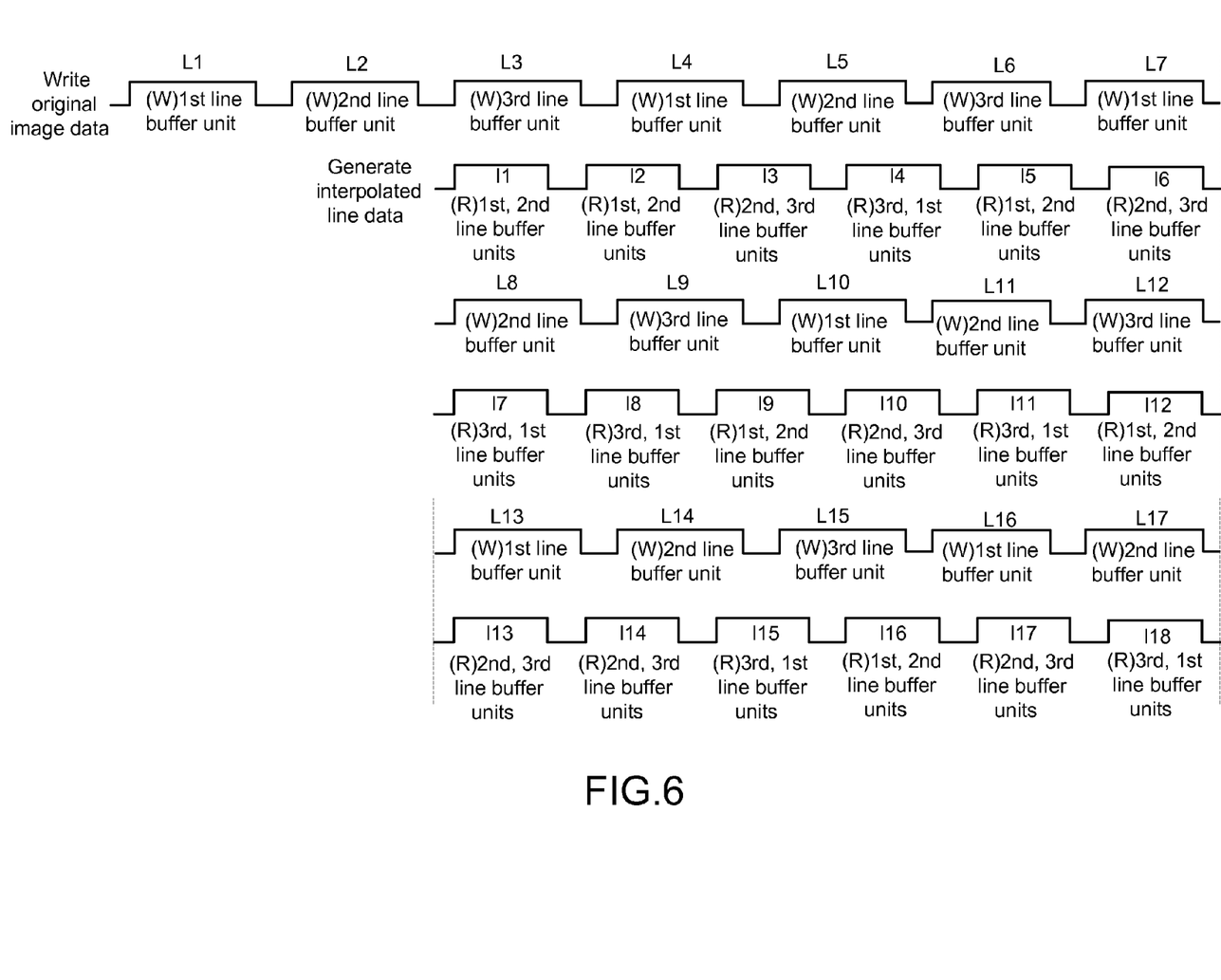
FIG. 6 is a schematic diagram illustrating the timing of writing the original image signal into the line buffer and generating the interpolated line data according to the present invention.

FIG. 6 is a schematic diagram illustrating the timing of writing the original image signal into the line buffer and generating the interpolated line data according to the present invention. From the timing diagram of writing the original image signal, it is found that the first original line data L1 and the second original data L2 are successively written into the first line buffer unit and the second line buffer unit. During the second original line data L3 is written into the third line buffer unit, the vertical linear operating unit calculates two interpolated line data l1 and l2 according to the first original line data L1 and the second original data L2. In practice, the first interpolated line data l1 is identical to the first original line data L1, and the second interpolated line data l2 is calculated by linear interpolation according to the ratio factor.

In comparison with the prior art, the first interpolated line data l1 can be generated ahead of time according to the present invention. As a consequence, all of the successive interpolated line data can be generated ahead of time.

From the above description, the scaling-up control method of the present invention is configured to firstly convert an original image signal having a first resolution into an interpolated image signal having a second resolution, and then convert the interpolated image signal into an output image signal having a third resolution. In addition, both of the vertical linear operating unit and the horizontal linear operating unit can perform the linear interpolation by utilizing the local locking mechanism. The local locking mechanism will be illustrated as follows.

First of all, a distance between two consecutive pixels of the original image signal in a first direction is set to be 1 unit length (U). Then, the initial values are set: n=1, X=0 and E=0, wherein n is a natural number, X is an actual position of the nth data, and E is a position error. Then, according to the first resolution and the third resolution, an exact ratio factor (B/A) in the first direction and an approached ratio factor (C/D) in the first direction are acquired, thereby calculating an error amount Δ between the exact ratio factor and the approached ratio factor, wherein A and B are natural numbers, and the numerator and the denominator of the fraction B/A are reduced to the lowest terms. Then, the following steps are sequentially done: (a) if n is not equal to A, setting X=X+(C/D)U and E=E+Δ, or if n=A, performing a global locking mechanism; (b) if E>L_min, setting X=X+L_min and E=E−L_min, wherein L_min is a distinguishable length; (c) performing a linear interpolation according to the original image signal or the interpolated image signal and X, thereby calculating at least one pixel value of the $n^{th}$ data; and (d) setting n=n+1, and going to the step (a).

For the vertical linear operating unit, the $n^{th}$ data is the $n^{th}$ interpolated line data of the interpolated image signal, and the distance between the two consecutive pixels in the first direction is the distance between first pixels of consecutive first and second original line data in a vertical direction.

For the horizontal linear operating unit, the $n^{th}$ data is the $n^{th}$ pixel of any output line data, and the distance between the two consecutive pixels in the first direction is the distance between two consecutive pixels of any interpolated line data in a horizontal direction.

Moreover, in a case that the vertical linear operating unit or the horizontal linear operating unit is an m-bit operating unit, the distinguishable length is the minimum distinguishable length, which is equal to $U/2^m$.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scaling-up control method of a display device for converting an original image signal having a first resolution into an interpolated image signal having a second resolution, and converting the interpolated image signal into an output image signal having a third resolution, the scaling-up control method comprising steps of:

setting a distance between two consecutive pixels of the original image signal in a first direction to be 1 unit length (U);

setting n=1, X=0 and E=0, wherein n is a natural number, X is an actual position of the nth data, and E is a position error;

acquiring an exact ratio factor (B/A) in the first direction and an approached ratio factor (C/D) in the first direction according to the first resolution and the third resolution, thereby calculating an error amount Δ between the exact ratio factor and the approached ratio factor, wherein A and B are natural numbers, and the numerator and the denominator of the fraction B/A are reduced to the lowest terms;

(a) if n is not equal to an integer multiple of A, setting X=X+(C/D)U and E=E+Δ, or if n is equal to the an integer multiple of A, performing a global locking mechanism;

(b) if E>L_min, setting X=X+L_min and E=E-L_min, wherein L_min is a distinguishable length;

(c) performing a linear interpolation according to the original image signal or the interpolated image signal and X, thereby calculating at least one pixel value of the nth data; and (d) setting n=n+1, and going to the step (a).

2. The scaling-up control method according to claim 1, wherein the nth data is the nth interpolated line data of the interpolated image signal.

3. The scaling-up control method according to claim 1, wherein the original image signal comprises plural original line data, and the distance between the two consecutive pixels in the first direction is the distance between first pixels of consecutive first and second original line data in a vertical direction.

4. The scaling-up control method according to claim 1, wherein the output image signal comprises plural output line data, and the nth data is the nth pixel data of any output line data.

5. The scaling-up control method according to claim 1, wherein the interpolated image signal comprises plural interpolated line data, and the distance between the two consecutive pixels in the first direction is the distance between two consecutive pixels of any interpolated line data in a horizontal direction.

6. The scaling-up control method according to claim 1, wherein the linear operating unit is an m-bit operating unit, and the distinguishable length is the minimum distinguishable length, which is equal to $U/2^m$.

7. A scaling-up control apparatus for use in a display device, the scaling-up control apparatus comprising:

a line buffer controlling unit for receiving an original image signal having a first resolution, wherein the original image signal comprises plural original line data;

a line buffer electrically connected to the line buffer controlling unit for temporarily storing the plural original line data;

a vertical linear operating unit electrically connected to the line buffer controlling unit for allowing the line buffer controlling unit to read two consecutive original line data of the plural original line data from the line buffer, and generating n interpolated image signal having a second resolution according to a global locking mechanism and a local locking mechanism, wherein the interpolated image signal comprises plural interpolated line data; and a horizontal linear operating unit electrically connected to the vertical linear operating unit for successively receiving the plural interpolated line data of the interpolated image signal, and generating an output image signal having a third resolution according to the global locking mechanism and the local locking mechanism, wherein the output image signal comprises plural output line data;

wherein the vertical linear operating unit performs a scaling-up control method comprising steps of:

setting a distance between two consecutive original line data of the original image signal in a vertical direction to be 1 unit length (U);

setting n=1, X=0 and E=0, wherein n is a natural number, X is an actual position of the nth interpolated line data, and E is a position error;

acquiring an exact ratio factor (B/A) in a vertical direction and an approached ratio factor (C/D) in the vertical direction according to the first resolution and the third resolution, thereby calculating an error amount Δ between the exact ratio factor and the approached ratio factor, wherein A and B are natural numbers, and the numerator and the denominator of the fraction B/A are reduced to the lowest terms;

(a) if n is not equal to an integer multiple of A, setting X=X+(C/D)U and E=E+Δ, or if n is equal to the integer multiple of A, performing the global locking mechanism;

(b) if E>L_min, setting X=X+L_min and E=E-L_min, wherein L_min is a distinguishable length;

(c) performing a linear interpolation according to the original image signal and X, thereby calculating plural pixel values of the nth interpolated line data; and (d) setting n=n+1, and going to the step (a).

8. The scaling-up control apparatus according to claim 7, wherein the vertical linear operating unit is an m-bit operating unit, and the distinguishable length is equal to $U/2^m$.

9. A scaling-up control apparatus for use in a display device, the scaling-up control apparatus comprising:

a line buffer controlling unit for receiving an original image signal having a first resolution, wherein the original image signal comprises plural original line data;

a line buffer electrically connected to the line buffer controlling unit for temporarily storing the plural original line data;

a vertical linear operating unit electrically connected to the line buffer controlling unit for allowing the line buffer controlling unit to read two consecutive original line data of the plural original line data from the line buffer, and generating n interpolated image signal having a second resolution according to a global locking mechanism and a local locking mechanism, wherein the interpolated image signal comprises plural interpolated line data; and a horizontal linear operating unit electrically connected to the vertical linear operating unit for successively receiving the plural interpolated line data of the interpolated image signal, and generating an output image signal having a third resolution according to the global locking mechanism and the local locking mechanism, wherein the output image signal comprises plural output line data;

wherein the horizontal linear operating unit performs a scaling-up control method comprising steps of:

setting a distance between two consecutive pixels of any interpolated line data of the interpolated image signal to be 1 unit length (U);

setting n=1, X=0 and E=0, wherein n is a natural number, X is an actual position of the nth pixel value of any output data line, and E is a position error;

acquiring an exact ratio factor (B/A) in a horizontal direction and an approached ratio factor (C/D) in the horizontal direction according to the first resolution and the third resolution, thereby calculating an error amount $\Delta$ between the exact ratio factor and the approached ratio factor, wherein A and B are natural numbers, and the numerator and the denominator of the fraction B/A are reduced to the lowest terms;

(a) if n is not equal to an integer multiple of A, setting X=X+(C/D)U and E=E+$\Delta$, or if n is equal to the integer multiple of A, performing the global locking mechanism;

(b) if E>L_min, setting X=X+L_min and E=E-L_min, wherein L_min is a minimum distinguishable length;

(c) performing a linear interpolation according to the plural interpolated line data and X, thereby calculating the pixel value of the nth pixel; and (d) setting n=n+1, and going to the step (a).

10. The scaling-up control apparatus according to claim 9, wherein the horizontal linear operating unit is an m-bit operating unit, and the distinguishable length is equal to $U/2^m$.

\* \* \* \* \*